United States Patent [19]
Gunn et al.

[11] Patent Number: 5,905,794
[45] Date of Patent: May 18, 1999

[54] CALLER IDENTIFICATION INTERFACE USING LINE REVERSAL DETECTION

[75] Inventors: Timothy D. Gunn; Ting Sun, both of Mounds View, Minn.

[73] Assignee: Multi-Tech Systems, Inc., Mounds View, Minn.

[21] Appl. No.: 08/730,371

[22] Filed: Oct. 15, 1996

[51] Int. Cl.⁶ ........................................ H04M 1/57
[52] U.S. Cl. .......................................... 379/382; 379/142
[58] Field of Search ..................... 379/142, 67, 88, 379/89, 93.05, 93.09, 93.23, 93.02, 373, 377, 382, 100.01, 93.17; 375/222; 455/557; 358/434

[56] References Cited

U.S. PATENT DOCUMENTS

| | | | |
|---|---|---|---|
| 3,904,830 | 9/1975 | Every, Sr. et al. | 179/18 |
| 3,997,732 | 12/1976 | Every, Sr. et al. | 179/18 |
| 4,320,265 | 3/1982 | Biggiogera et al. | 379/382 |
| 4,425,512 | 1/1984 | Tomooka et al. | 379/382 |
| 4,447,675 | 5/1984 | Arntsen et al. | 379/382 |
| 4,528,425 | 7/1985 | Melindo et al. | 379/382 |
| 4,531,023 | 7/1985 | Levine | 179/2 |
| 4,740,963 | 4/1988 | Eckley | 370/110.1 |
| 4,965,789 | 10/1990 | Bottau et al. | 370/79 |
| 5,054,055 | 10/1991 | Hanle et al. | 379/142 |
| 5,206,900 | 4/1993 | Callele | 379/142 |
| 5,263,084 | 11/1993 | Chaput et al. | 379/215 |
| 5,301,246 | 4/1994 | Archibald et al. | 380/23 |
| 5,347,572 | 9/1994 | Avni | 379/93.13 |
| 5,371,853 | 12/1994 | Kao et al. | 395/2.32 |
| 5,377,260 | 12/1994 | Long | 379/95 |
| 5,388,150 | 2/1995 | Schneyer et al. | 379/67 |
| 5,414,796 | 5/1995 | Jacobs et al. | 395/2.3 |
| 5,425,089 | 6/1995 | Chan et al. | 379/183 |
| 5,521,975 | 5/1996 | Hashimoto | 379/382 |
| 5,526,406 | 6/1996 | Luneau | 379/142 |
| 5,526,423 | 6/1996 | Ohuchi et al. | 379/67 |
| 5,546,448 | 8/1996 | Caswell et al. | 379/142 |
| 5,631,745 | 5/1997 | Wong et al. | 358/434 |
| 5,675,640 | 10/1997 | Tappart et al. | 379/373 |
| 5,699,410 | 12/1997 | Imamura et al. | 379/67 |
| 5,699,417 | 12/1997 | Khojasteh | 379/142 |
| 5,699,418 | 12/1997 | Jones | 379/142 |
| 5,745,558 | 4/1998 | Richardson, Jr. et al. | 379/189 |

FOREIGN PATENT DOCUMENTS

488865A2  6/1992  European Pat. Off. .

OTHER PUBLICATIONS

U.S. West Caller ID publication, one page.
European Search Report for Application No. EP 93403164 completed Sep. 21, 1995 by Examiner Lambley; 4 pages.
"Applications of the MT8841 Calling Number Identification Circuit", *Mitel Microelectronics Digital/Analog Communications Handbook*, Doc. No. 9161–001–060, Issue 1, pp. 12–299 thru 12–307, (1993).
"Mitel MT8841 Calling Number Identification Circuit", *Mitel Microelectronics Digital/Analog Communication Handbook*, Doc. No. 9161–952–007–NA, Issue 9, table of contents and pp. 8–93 thru 8–102, (1993).
Casale, S., et al., "Statistical Voice/High–Speed Data Multiplexing on a 64 KBIT/S Channel", *IEEE*, pp. 459–464, dated 1991.
Gulick, D., et al., "Interface for the IDSN to Your PC with A Voice/Data Board", *Electronic Design*, pp. 85–88, dated Dec. 10, 1987.
Komiya, T., et al., "An Approach to the Multifunction Graphic Terminal for the IDSN Environment", *IEEE*, pp. 32–36, dated 1988.
Sasaki, S., et al., "Variable Rate Voice Coding System", *IEEE*, pp. 364–367, dated 1992.

*Primary Examiner*—Scott Wolinsky
*Attorney, Agent, or Firm*—Schwegman, Lundberg, Woessner & Kluth, P.A.

[57] ABSTRACT

An interface for modems is described which provides rapid identification of a caller and limited access based on a variety of parameters obtained from caller identification information encoded by the telephone company. A line reversal detector is incorporated to signal when the caller identification information is available for reception. A two stage detection system is used to eliminate false signaling of line reversals and discriminate line reversals from ringing and other noise signals.

38 Claims, 16 Drawing Sheets

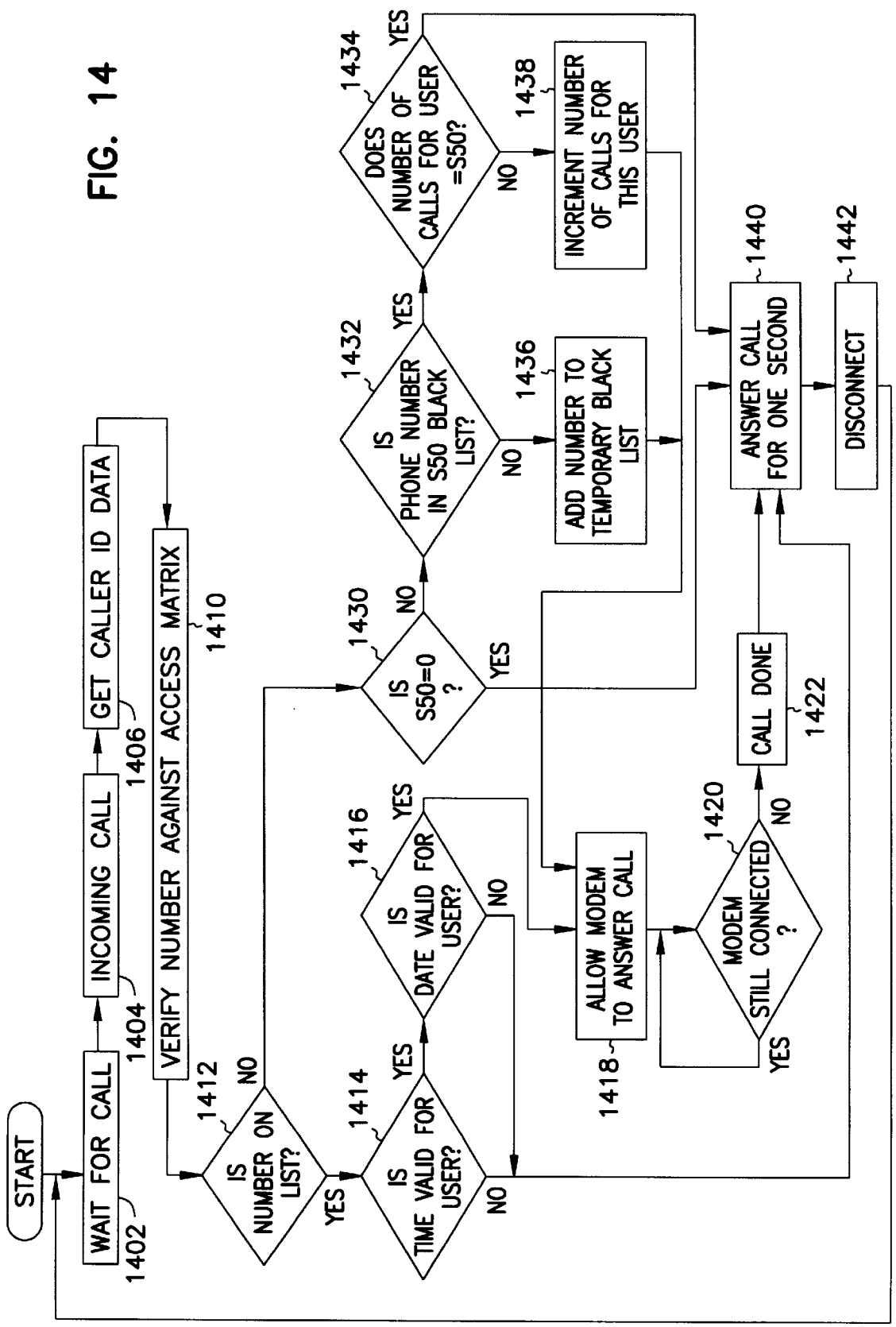

CALLER IDENTIFICATION INTERFACE USING LINE REVERSAL DETECTION

FIELD OF THE INVENTION

The present invention relates to detection of caller identification information, and in particular to a caller identification information interface having line reversal detection.

BACKGROUND OF THE INVENTION

Modem computer systems rely on data modems and standard telephone services for remote transfer of digital information. Modems are used in several applications, such as bulletin board services (BBSs), computers, and computer networks. Modems are also used for automated banking and credit card transactions.

FIG. 1 shows a prior art modem installation 150 wherein a modem 110 is collocated with a computer system 100 and connected to a telephone service 130 via telephone cable 120. Modem 110 may be located internally or externally to computer system 100. Connection 140 is through the backplane of computer system 100 if modem 110 is internally connected and connection 140 is a cable if modem 110 is externally connected. Computer system 100 may be a personal computer, a network of computers, mainframe, or other specialized computing hardware.

Telephone services offer encrypted caller identification information ("caller ID" information) to users for identification of the calling party. This information includes the caller's name, telephone number, and address. However, the signaling protocol used to transmit the caller ID information varies from country to country. In the United States, the caller identification information is transmitted after the first ring in an incoming telephone call. In the United Kingdom, the caller identification information is transmitted before the first ring and the transmission of the data is signaled by a line reversal of the tip and ring telephone lines. This is accomplished by swapping the signals on the tip and ring lines. Therefore, caller ID interfaces designed to detect caller ID information after a first ring will not function on services which use the line reversal as a signaling method.

There is a need in the art for a caller ID interface having line reversal detection. The caller ID interface should be designed to distinguish line reversals over other transient noise and ringing signals. Furthermore, the caller ID interface must not confuse other signaling tones with the line reversal.

SUMMARY OF THE INVENTION

The present disclosure describes a system for caller ID decoding using line reversal detection.

In one embodiment, a detector system is used to identify and validate line reversal events. The caller ID information is subsequently retrieved at a specified time after the line reversal event. In one embodiment, an optically isolated full wave rectifier is used to detect line reversals. A processor having a timer monitors the output of the rectifier to validate that the pulse received from the rectifier is a true line reversal event. This embodiment avoids erroneously denoting a noise or ringing signal as a line reversal event. The caller ID information is thereafter decoded and processed.

In one embodiment, a caller ID interface having the detection system is connected between the modem and the telephone line. In an alternate embodiment, the caller ID interface having the detection system is located within the modem.

BRIEF DESCRIPTION OF THE DRAWINGS

In the drawings, where like numerals describe like components throughout the several views:

FIG. 14 is a flowchart showing one possible implementation of a screening mode algorithm.

DETAILED DESCRIPTION OF THE PRESENT INVENTION

In the following detailed description, references are made to the accompanying drawings which form a part hereof and in which is shown by way of illustration specific embodiments in which the invention may be practiced. These embodiments are described in sufficient detail to enable those skilled in the art to practice and use the invention, and it is to be understood that other embodiments may be utilized and that electrical, logical, and structural changes may be made without departing from the spirit and scope of the present invention. The following detailed description is, therefore, not to be taken in a limiting sense and the scope of the present invention is defined by the appended claims and their equivalents.

An External Caller ID Interface

Figure 2A:
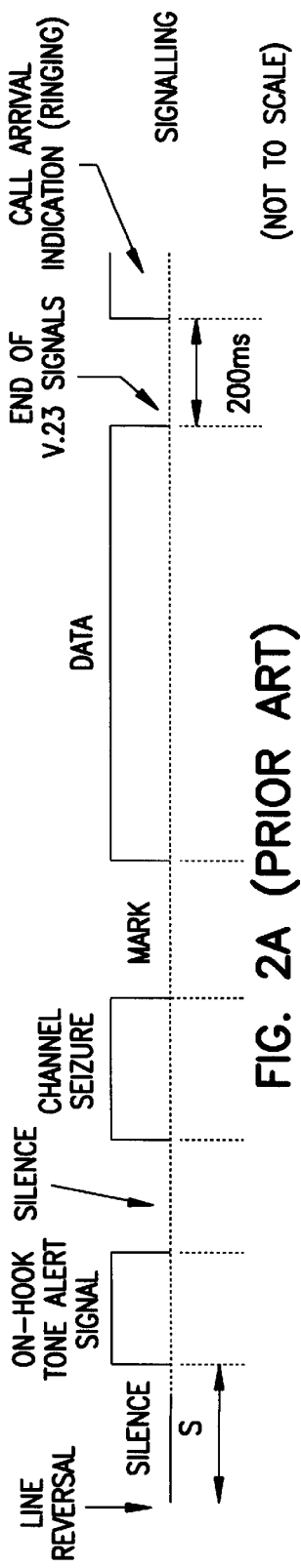
FIG. 2A is a timing diagram showing temporal relationship between a line reversal event, caller identification information, and telephone ringing in one line reversal signaling system.
Figure 2B:
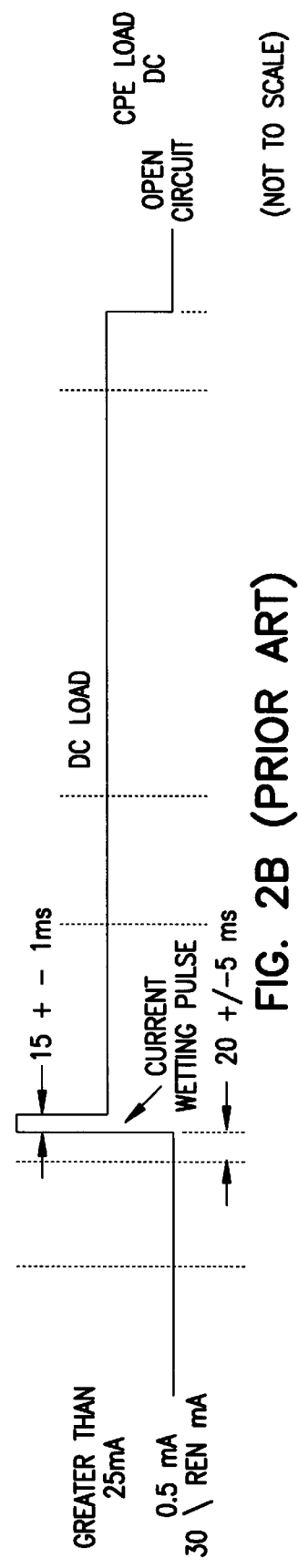
FIG. 2B is a timing diagram showing the temporal position of the current wetting pulse and loading of the telephone lines according to the timing diagram of FIG. 2A.
Figure 2C:
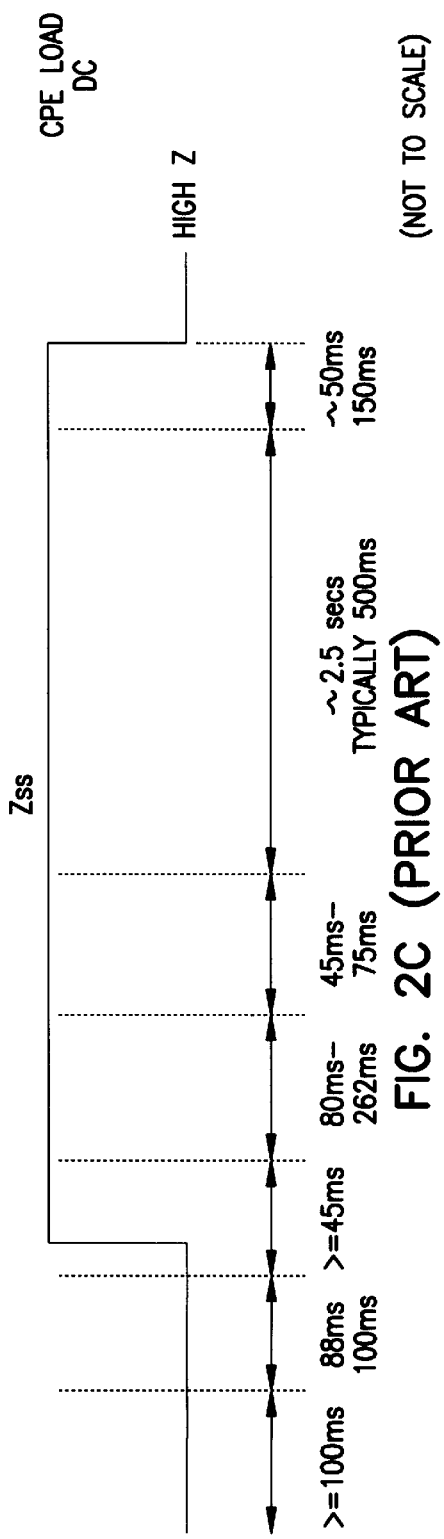
FIG. 2C is a timing diagram showing the load impedance as a function of time according to the timing diagrams of FIG. 2A and FIG. 2B.

FIG. 2A shows one example of a telephone service which uses line reversal to signal subsequent transmissions of caller identification (caller ID) information. The telephone service shown in FIGS. 2A–2C is used in the United Kingdom for signaling caller identification events, however, this protocol is used for the purposes of demonstrating the present invention, and is not intended in an exclusive or limiting sense. Any protocol using line reversals may be substituted without departing from the scope and spirit of the present invention. The protocol of FIGS. 2A–2C is described in detail in the document "CDS Calling Line Identification Service Suppliers Information Note", Issue 01, August 1994, which is hereby incorporated by reference in its entirety.

The line reversal event in FIG. 2A is followed by a brief period of silence, and then a number of signaling tones. The caller ID information is not sent until a current wetting signal is produced by the receiver. The current wetting pulse, as shown in FIG. 2B, occurs shortly after the signaling tones. The telephone service responds with the caller identification information, which is followed by a ringing signal. The loading of the telephone lines is shown in FIG. 2C.

Figure 1:
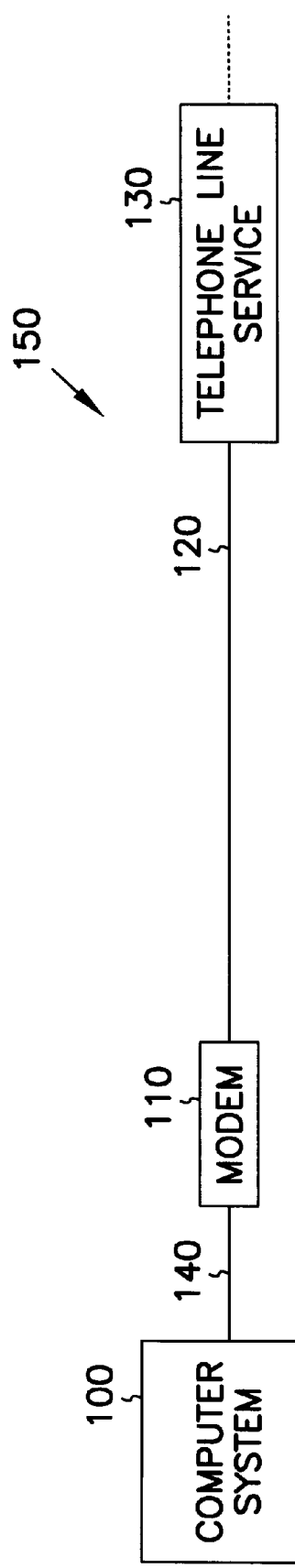
FIG. 1 is a general block diagram showing a prior art connection between a computer system and a telephone service.
Figure 3:
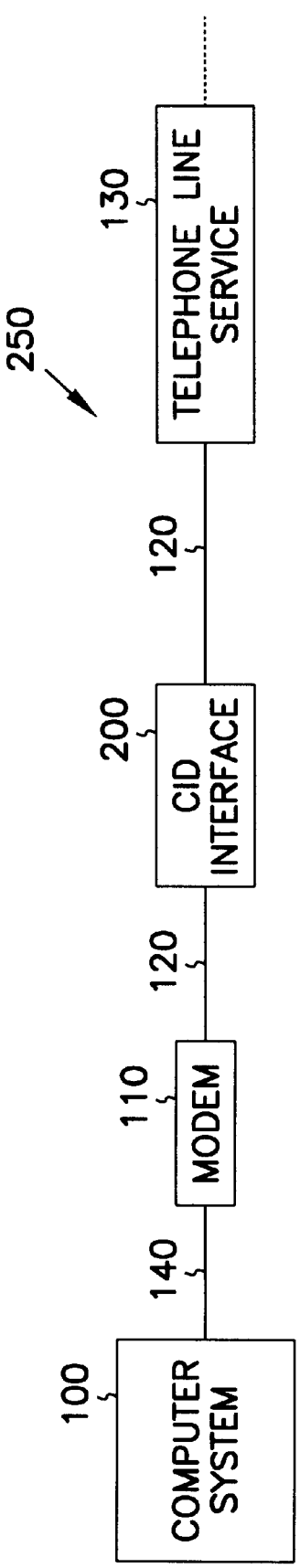
FIG. 3 shows a block diagram of one application of a caller ID interface according to one embodiment of the present invention.

FIG. 3 shows one embodiment of the present system in which an external caller ID interface 200 having line reversal detection means is inserted between modem 110 and telephone line service 130 using telephone cables 120. In this embodiment of the present invention, external caller ID interface 200 may be used to provide caller ID functionality to existing modems 110. Modem 110 is connected to computer system 100 over cable 140, however, modem 110 may be located either externally or internally to computer system 100 without substantially departing from the operation of the present system.

Other embodiments exist in which external caller ID interface 200 services a plurality of modems in order to connect a plurality of telephone line services to a computer network. Multiple modem embodiments are shown in U.S. Pat. No. 5,546,448, filed Nov. 10, 1994, entitled APPARATUS AND METHOD FOR A CALLER ID MODEM INTERFACE, the entire specification of which is hereby incorporated by reference. Applicants also hereby incorporate by reference the entire specification of the copending patent application, entitled COMPUTER-BASED MULTI-FUNCTION PERSONAL COMMUNICATION SYSTEM WITH CALLER ID, Ser. No. 08/338,340, filed Nov. 10, 1994. This application describes a caller ID interface for use with a multifunction personal communication system. Other applications of the caller ID interface are possible without departing from the scope and spirit of the present invention.

Figure 4:
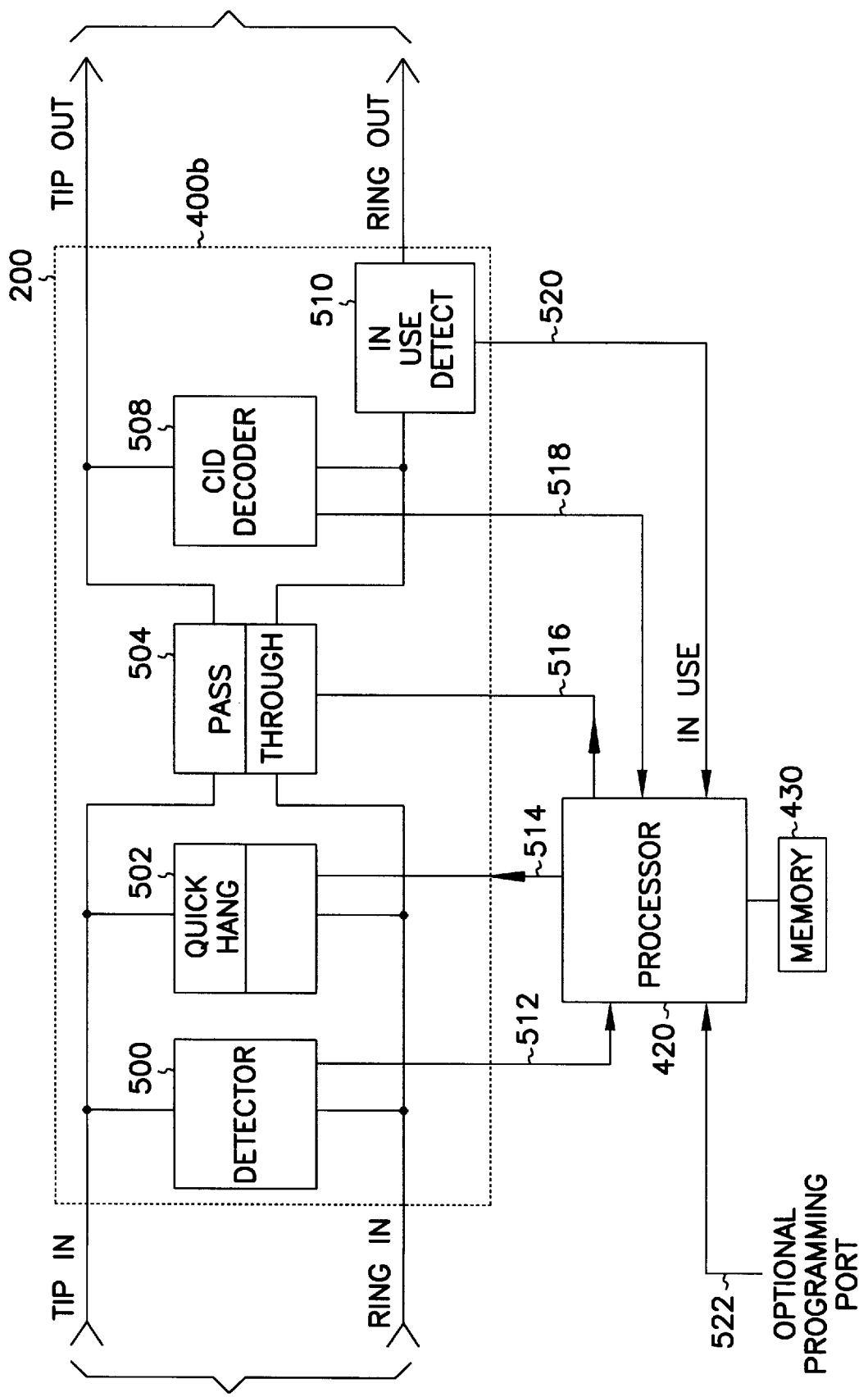
FIG. 4 is a general block diagram of one embodiment of the caller ID interface in FIG. 3.

FIG. 4 shows one embodiment of an external caller ID interface 200. Telephone line signals enter at the Tip and Ring terminals. Detector 500 is used in conjunction with processor 420 to detect line reversals and ringing signals from the telephone line. Quick hang circuit 502 is capable of placing the telephone line in an "off hook" state under control of processor 420. Pass through circuit 504 controls signals transmitted to the caller identification decoder 508. In use detector 510 detects when a call is being conducted over the telephone line and a device connected to the Tip out and Ring out signals. If the device is a modem, then the loop holding circuit in the modem is used to maintain the telephone call being conducted.

When a line reversal is detected, the processor 420 will allow decoder 508 to read the caller identification information when presented on the Tip and Ring connections. The caller identification information may be used to determine whether the call should be answered or whether the quick hang circuit 502 should be invoked to "hang up" on the calling party.

Figure 5A:
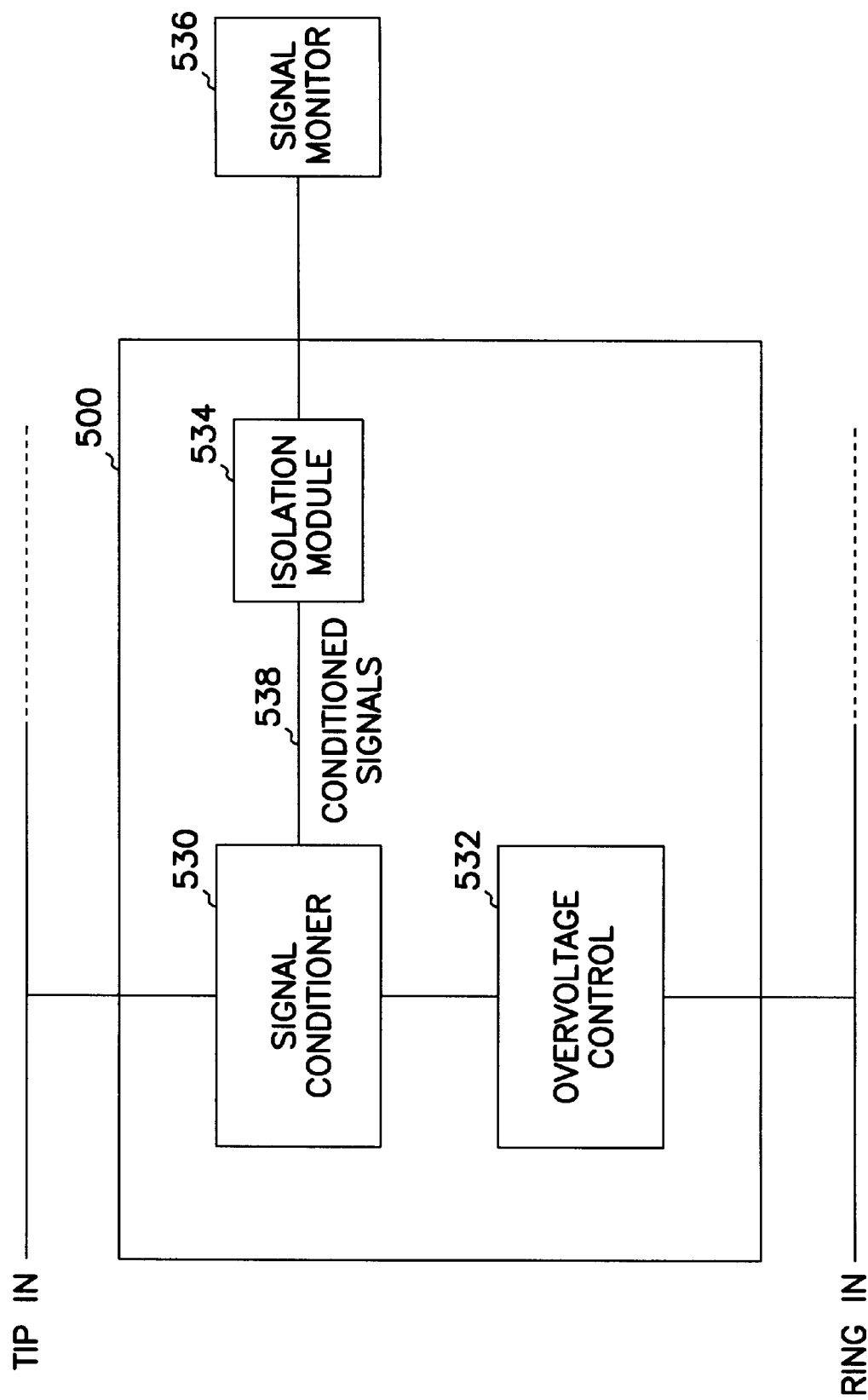
FIG. 5A is a block diagram of one embodiment of a detector and its connections to the telephone service.

FIG. 5A shows a block diagram of one embodiment of detector 500 and its connections to the telephone service and a signal monitor 536. Overvoltage control 532 is used to control the amount of voltage applied to the Tip and Ring connections and to the signal conditioner 530 to prevent an overvoltage condition from damaging the electronics. Signal conditioner 530 conditions signals on the Tip and Ring connections. The conditioned signals 538 include any sample or derivative of the signals on the Tip and Ring connections which are useful for detecting a line reversal. The conditioned signals 538 are presented to isolation module 534. The signals received by signal monitor 536 are isolated by isolation module 534. Isolation module 534 is an optional protection to decouple the telephone system from the remaining electronics. In alternate embodiments, the isolation module 534 is not used and the conditioned signals 538 from signal conditioner 530 are transferred directly to signal monitor 536.

In one embodiment, signal conditioner 530 presents a high DC impedance to limit the steady state current drawn from the Tip and Ring connections. In one embodiment, signal conditioner 530 presents a low AC impedance and provides conditioned signals 538 including the AC component of the signals present on the Tip and Ring connections. The conditioned signals 538 are monitored by signal monitor 536 to determine whether a line reversal event has occurred.

Figure 5B:
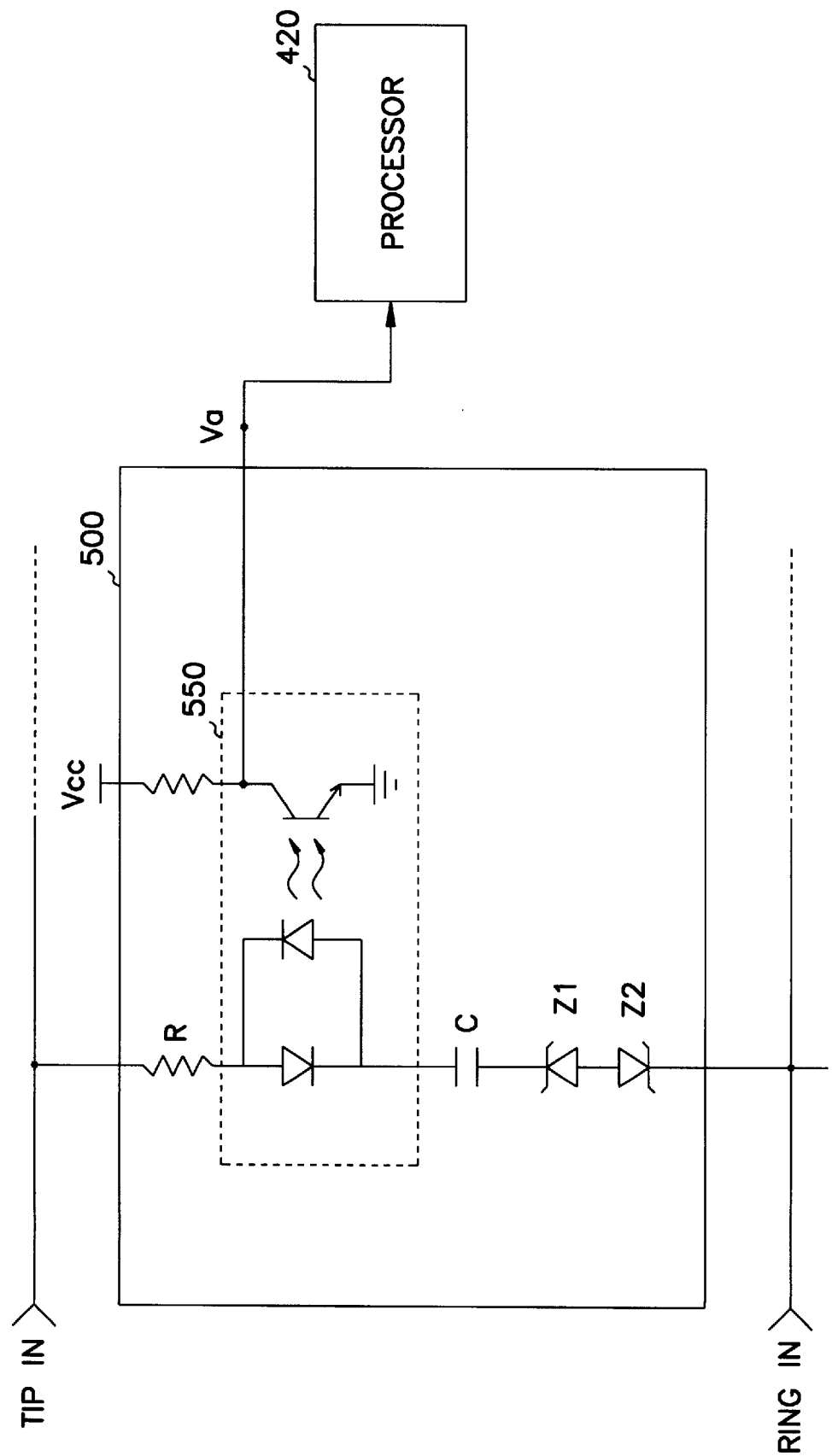
FIG. 5B is a schematic diagram of the detector using a full wave rectifier according to one embodiment of the present invention.
Figure 5C:
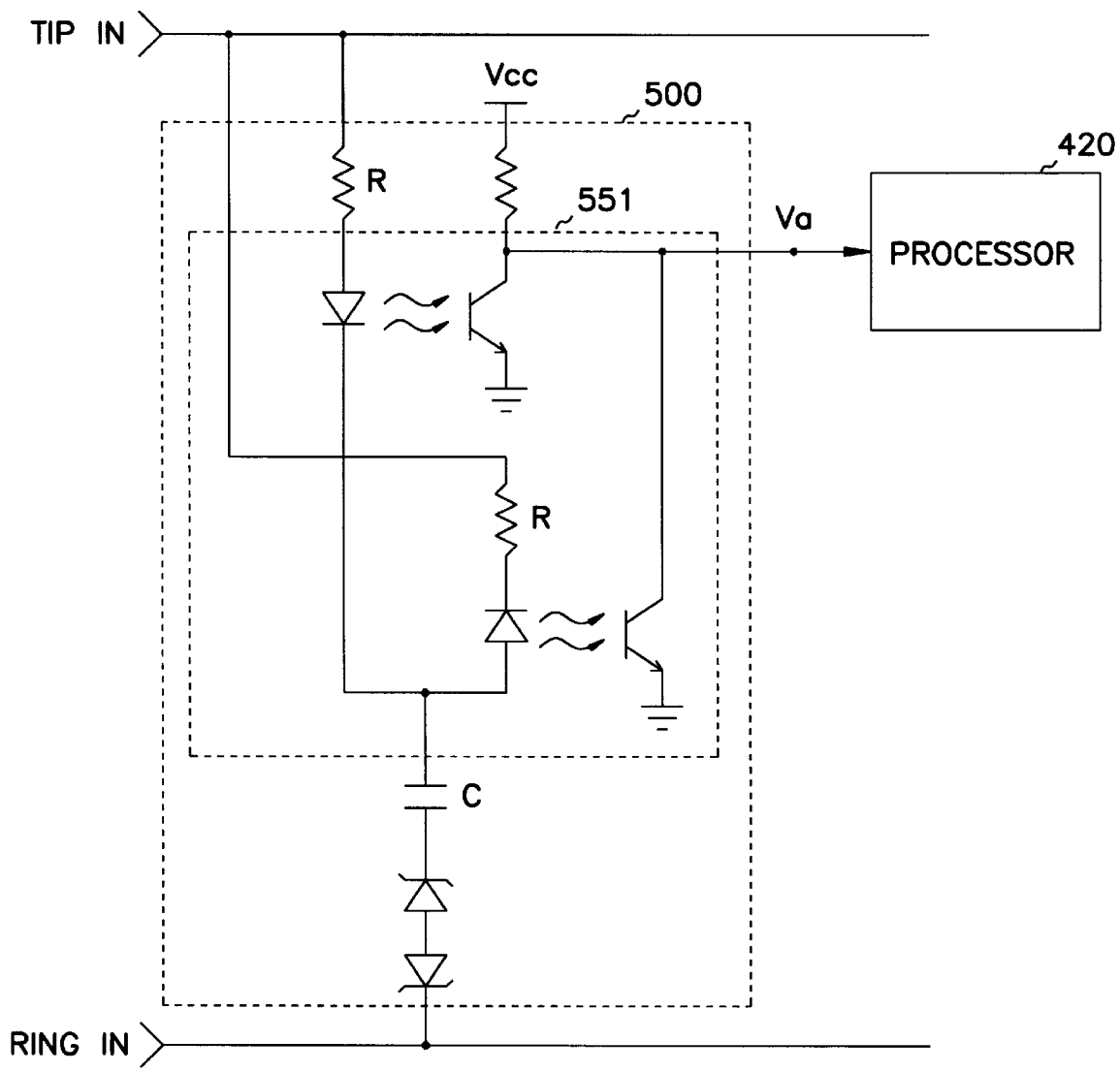
FIG. 5C is a schematic diagram of the detector using two half-wave rectifiers according to one embodiment of the present invention.
Figure 5D:
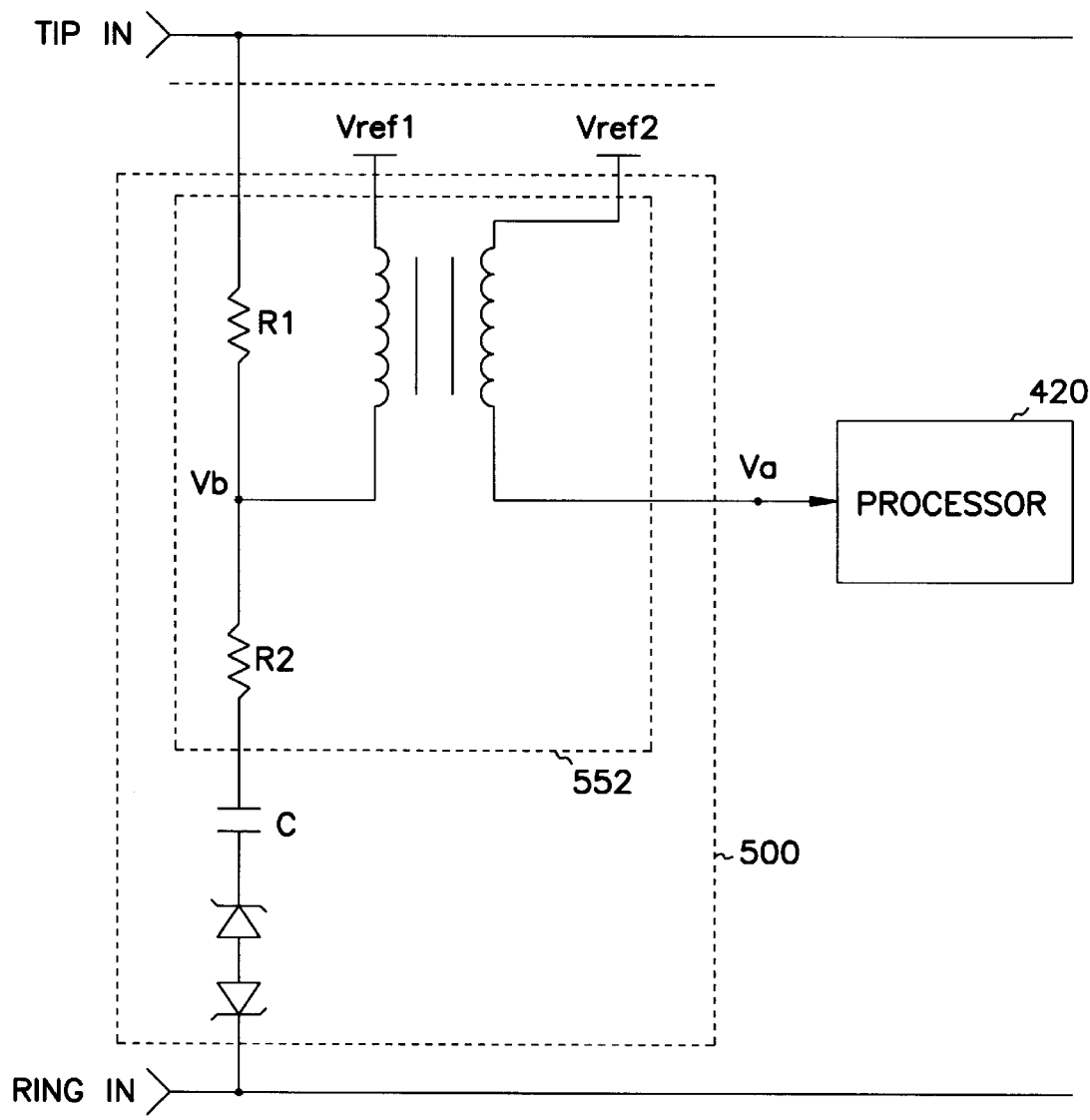
FIG. 5D is a schematic diagram of the detector using a transformer according to one embodiment of the present invention.

FIG. 5B, 5C and 5D show some embodiments of a detector 500 which may be practiced in the interface shown in FIG. 4. One skilled in the art will recognize that other embodiments may be utilized without departing from the spirit and scope of the present invention.

In FIG. 5B, the signal conditioner 530 comprises a full wave rectifier in series with a resistor and a capacitor. The overvoltage control function is performed by series connected zener diodes Z1 and Z2. These diodes are used to limit voltage across the Tip and Ring lines to prevent an overvoltage from damaging the interface circuitry. In one embodiment, a module including the full-wave rectifier also performs the duties of the isolation module 534 by incorporating an optically isolated output transistor circuit. In FIG. 5B, the module 550 is used in conjunction with the capacitor C and resistor R to detect transitions in voltage on the Tip and Ring connections. One example of module 550 is the Motorola Bidirectional Optical Coupler Part Number H11 AA4. Resistor R and capacitor C are series connected with rectifier 550 to determine the characteristic time constant of the detector 500. In one embodiment, resistor R and capacitor C determine the characteristic time constant of detector 500 by substantially setting the time constant. In another embodiment resistor R and capacitor C are tuned to adjust the time constant of detector 500. In another embodiment, alternative devices, such as a resistor and an inductor, are used to determine the characteristic time constant of detector 500.

Signals from the optically isolated output transistor circuit are monitored by processor 420, which acts as a signal monitor 536 in this embodiment. The optoisolator transistor is normally off when no signal is rectified by module 550, and the transistor is conducting when signals are rectified by module 550. When a line reversal occurs across the Tip and Ring lines, current flows through resistor R, through one diode of rectifier 550 and through capacitor C. The transient current flows until capacitor C is charged and current flow is inhibited. The transient current through the diode activates the optoisolator transistor. Activation of the transistor causes current to flow from Vcc to ground which pulls Va to ground. In this embodiment, the optoisolator transistor circuit performs a digitization of the transient current, due to the nonlinearities of the optoisolator transistor, and generates a digital pulse to indicate the line reversal event.

Figure 6A:
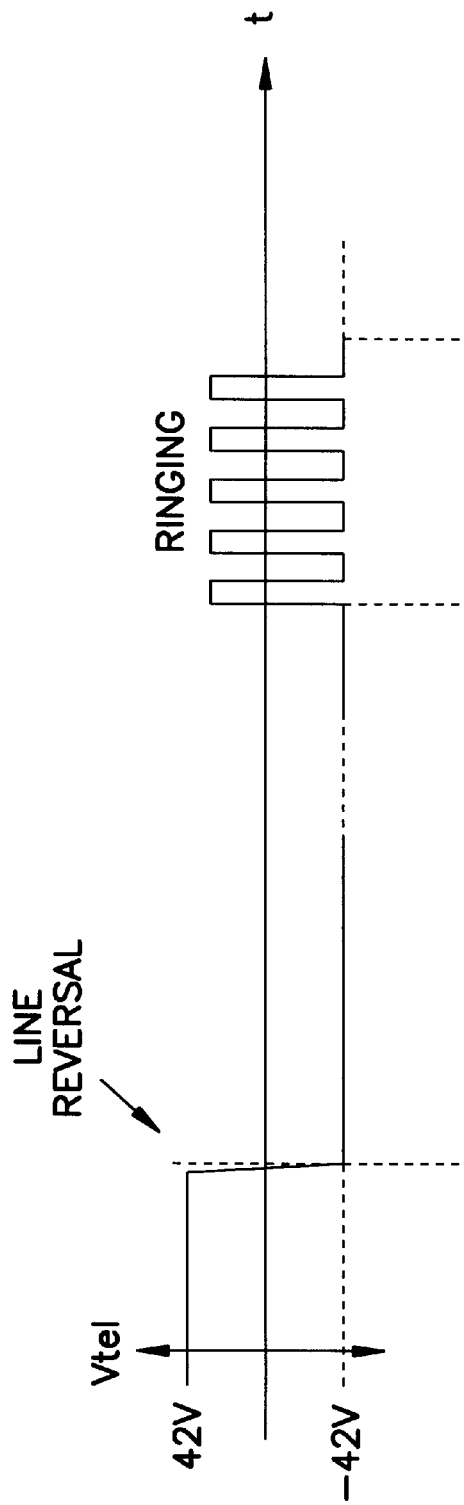
FIG. 6A is a plot of the telephone line voltage during a true line reversal and a ringing signal.
Figure 6B:
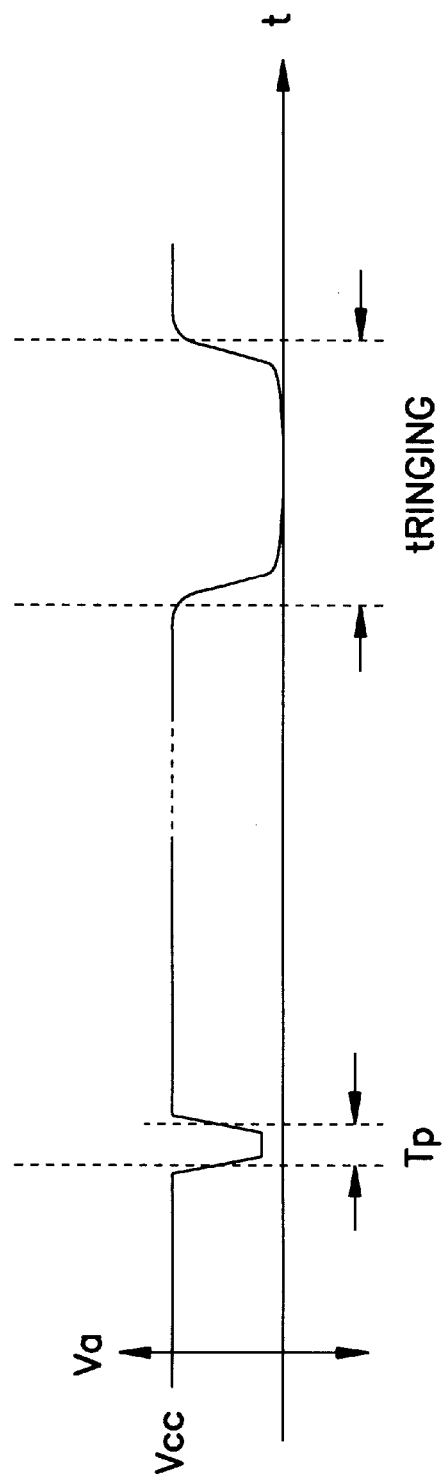
FIG. 6B is a plot of the output voltage of the detector, according to one embodiment, as a function of the telephone line voltages shown in FIG. 6A.

Therefore, a step function, such as a polarity reversal of the Tip and Ring lines, produces a short interruption of voltage Va, which has a duration of approximately the time constant produced by capacitor C and resistor R, $Tp{\approx}RC$. FIG. 6A shows an example of a line reversal across the Tip and Ring lines. The resulting voltage waveform Va is a downward pulse of duration which is approximately the time constant, $Tp{\approx}RC$, as shown in FIG. 6B. Similarly, when a subsequent line reversal occurs, a transient current flows the opposite direction through the other diode of rectifier 550 thus activating the optoisolator transistor and creating a similar interruption in voltage Va.

Transitions of the voltage waveform Va due to a valid line reversal and other noise or ringing signals must be discriminated to prevent erroneous line reversal detection and ensure proper caller ID decoding. The time constant provides a characteristic approximate pulse duration for step function inputs, such as line reversals. This expected duration is useful to eliminate other transients sensed by the detector 500. For example, the ringing signal shown in FIG. 6A produces a substantially longer transition of the output voltage of the detector, as demonstrated in FIG. 6B. Pulses due to noise are substantially shorter duration than the expected time constant, and are eliminated by measurements indicating their length. In one embodiment, processor 420 eliminates noise pulses on the basis of their short duration, as compared to the expected time constant. In one embodiment, the difference in pulse lengths is used as a first step in eliminating ringing signals as possible candidates for line reversal events. A second step is to ensure that pulses are not detected in a predetermined "quiet period", according to a known protocol, to ensure that the transitions are due to line reversal events and not to ringing or other noise signals.

In one embodiment, resistor R is set to 22 KOhms and capacitor C is set to 0.47 microfarads. The resulting time constant is approximately 10 milliseconds, however a range of pulse durations are used to account for nonlinearities in the system or other errors in measuring time delay. In this embodiment, any pulse of approximately 8 to 10 milliseconds is deemed to be a valid line reversal. An input of processor 420 is used to monitor voltage Va and measure the duration of the pulse from the detector 500. Pulses lasting for shorter periods of time are ignored as noise pulses.

The time constant may be any time value which lies between a typical noise pulse duration and the period of a ringing pulse. The overall time constant of the detector must meet these criteria, however, the time constant of the R and C combination may vary depending on the time constants associated with other components in the detector, such as the rectifier.

In one embodiment, the ringing signal is a 20 Hz, which implies a period of 50 milliseconds between ringing pulses. In this example, the time constant of the detector should lie between the typical noise time constant and the period of the ringing signal, or 50 milliseconds. Time constants longer than the typical ringing period are possible, but must be shorter than the duration of the entire ringing signal to discriminate a line reversal pulse from a ringing signal.

Other pulse duration ranges may be used and these ranges may be adjusted for other ringing signal frequencies without departing from the scope and spirit of the present invention. The examples given herein are intended to be demonstrative and not exclusive.

In one embodiment, pulses under approximately the time constant and greater than a characteristic noise pulse length are deemed potential line reversal events. A second test is performed to ensure that the event is a line reversal and not other noise. In one embodiment, the second test is to monitor the outputs of the detector 500 for a fixed time after the potential line reversal event. This is also known as silence detection. By verifying that the line is silent after the event, the likelihood that the signal is noise or a ringing signal is greatly diminished. The silence period is determined by the protocol used by the telephone service. Of course, this silent period must terminate before the signaling tones are sent by the telephone service. This silent period is shown as period S in FIG. 2A. In one embodiment, the period S is approximately 50 to 80 milliseconds. The silence detection is performed by a timer in processor 420 in this embodiment.

One skilled in the art will readily recognize that the times described herein may be changed without departing from the scope and spirit of the present invention. Other timers may be substituted without departing from the scope and spirit of the present invention. Furthermore, the two step detection described herein may be performed using different components and in different sequences without departing from the scope and spirit of the present invention.

FIG. 5C illustrates another embodiment for a detector 500 for the interface shown in FIG. 4. In this embodiment, rectifier 500 is implemented by two half-wave opto-isolated rectifiers instead of the fall-wave opto-isolated rectifier used in the embodiment shown in FIG. 5B.

In the steady state, capacitor C is charged thus inhibiting current flow. Therefore, both opto-isolated transistors are inactive and Va floats to Vcc. When a line reversal across the Tip and Ring connections occurs, current flows through one of the two diodes of module 551 creating a transient current and activating the corresponding opto-isolated transistor. Activation of the transistor pulls Va to ground until the transient current is inhibited by the capacitor C reaching its full charge. When a subsequent line reversal occurs, a transient current flows in the opposite direction through the other diode of module 551 thus activating the other opto-isolated transistor. In this manner, a line reversal produces an output voltage Va corresponding to the waveform illustrated in FIG. 6B and previously discussed.

FIG. 5D illustrates a third embodiment for a detector 500. In FIG. 5D, module 552 is implemented by a transformer which provides signal isolation from the Tip and Ring lines. Resistor R1 and resistor R2 form a voltage divider such that when a line reversal occurs, current flows from Vref1 through the primary coils of the transformer to Vb until capacitor C is charged. This transient current will create a current in the secondary windings of the transformer thus changing Va from its steady state voltage of Vref2. The voltage change produced at node Va can be monitored by processor 420 to determine line reversals. It is emphasized that other embodiments of the detector 500 may be utilized without departing from the spirit and scope of the present invention.

In the embodiment shown in FIG. 5 a digital pulse is presented to the processor 420, which means that pulse length detection is performed using a counter. However, for embodiments which do not present a digitized version of the transition pulse, an analog to digital converter may be used to detect the pulse duration. Other digitizing methods may be employed to generate a digital output, such as threshold detectors and signal integrators. Other measurement methods may be incorporated without departing from the scope and spirit of the present invention.

Figure 7:
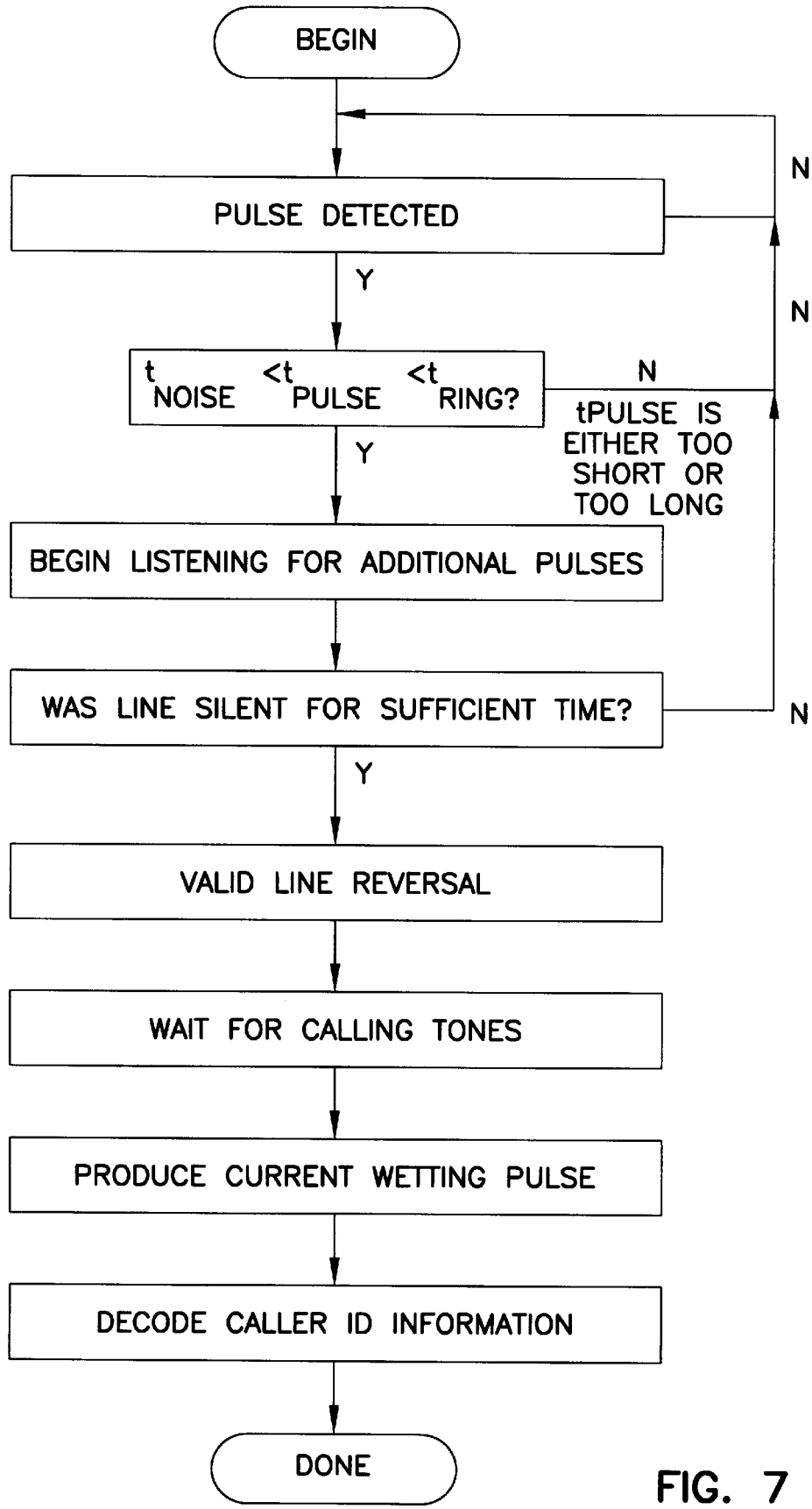
FIG. 7 is a flow diagram showing one system for discriminating line reversal events from noise and ringing events.

The two step detection system described above is shown in FIG. 7 in greater detail. The detection begins by monitoring the voltage Va for a transition. If a pulse is detected, then its duration is tested to ensure it is approximately the time constant of the resistor R and capacitor C. If the pulse is too long, it is ignored as a ringing signal. If the pulse is too short, it may be ignored as a noise pulse. If the pulse is of expected duration then silence detection is invoked to detect whether the pulse is the first of a series of pulses. If the line was silent for a sufficient amount of time, then the event is deemed a valid line reversal. The processor is programmed to wait for the appropriate calling tones, pursuant to the particular protocol being used. If the protocol uses a current wetting pulse to initiate caller identification information transmission, then the interface transmits the current wetting pulse and waits for arrival of the caller identification information. In one embodiment, the current wetting pulse is produced by toggling the device offshoot for the predetermined wetting pulse period. This may be performed using the quick hang circuit 502 to generate the current wetting pulse.

According to one embodiment of the present invention, after detection of a valid line reversal and reception of the caller ID information, processor 420 processes the caller ID information received to determine if the incoming call is an authorized call. If the call is authorized, the in-use detect circuit 510 is enabled. If the call is unauthorized, the telephone line may be hung up by processor 422 using signal line 514 to quick hang circuit 502.

Remote input 522 is an optional input to allow remote control and programming of external caller ID interface 200. One embodiment of the present invention uses a standard RS-232 protocol and a dedicated computer to program caller ID interface 200 via remote input 522. An alternate embodiment employs modified caller ID decoder circuitry 508 and escape sequences to program the interface from modem 110. This is accomplished by decoding a predetermined escape sequence to program the caller ID interface 200.

Further details of the components in FIG. 4 are described in U.S. Pat. No. 5,546,448, entitled APPARATUS AND METHOD FOR A CALLER ID MODEM INTERFACE, the entire specification of which was incorporated by reference, above.

In one embodiment, caller ID decoder 508 includes a Mitel MT8841 Calling Number Identification Circuit as specified in the Mitel Microelectronics Digital/Analog Communications Handbook, Doc. No. 9161-952-007-NA, issue 9 (1993), which is hereby incorporated by reference. Those skilled in the art will readily recognize that other caller ID decoding circuits may be used without departing from the scope and spirit of the present invention.

In one embodiment of the present invention processor 420 is the Zilog Z182 Microprocessor as specified in the Z180 Family Microprocessors and Peripherals Databook, Doc No. Q2/94 DC 8322-00, which is hereby incorporated by reference. Those skilled in the art will readily recognize that other processors may be used without departing from the scope and spirit of the present invention.

Alternate embodiments may use sophisticated, multifunction decoding devices and data pumps to perform the functions of caller ID chip. Additionally, processor 420 may be replaced with combinational logic to control the operation of the caller ID interface.

An Internal Caller ID Interface

Figure 8:
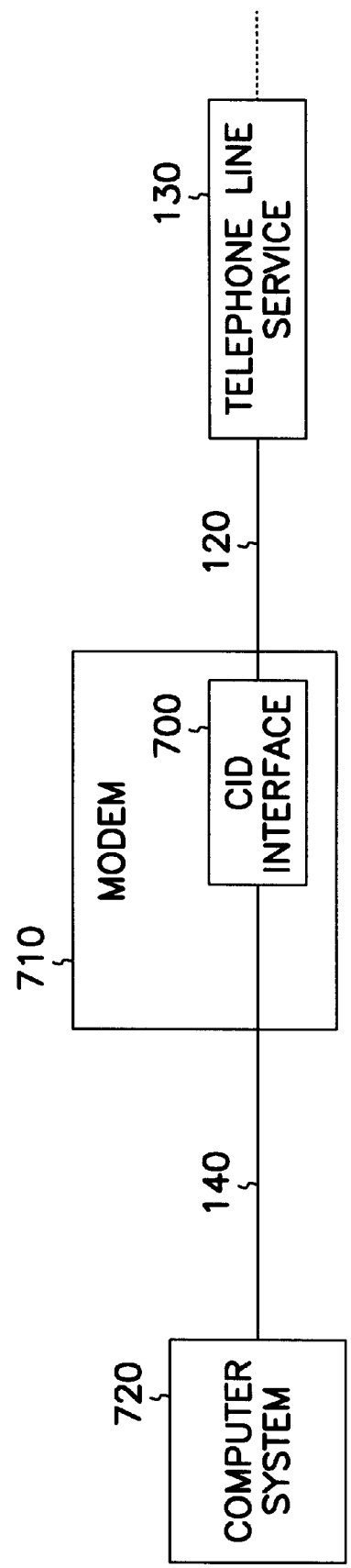
FIG. 8 is a block diagram of an alternate embodiment of the caller ID interface according to one embodiment of the present invention.

FIG. 8 shows one embodiment of an internal caller ID interface 700 in data modem 710, which interconnects telephone service 130 to computer system 720. Modem 710 is connected to computer system 720 over connection 140; alternate embodiments feature modem 710 as connected internally to computer system 720 and as externally connected to computer system 720. Modem 710 is connected to telephone service 130 over telephone line 120.

Other embodiments of an internal caller ID interface are described in U.S. Pat. No. 5,546,448, entitled APPARATUS AND METHOD FOR A CALLER ID MODEM INTERFACE, the entire specification of which was incorporated by reference, above.

Figure 9:
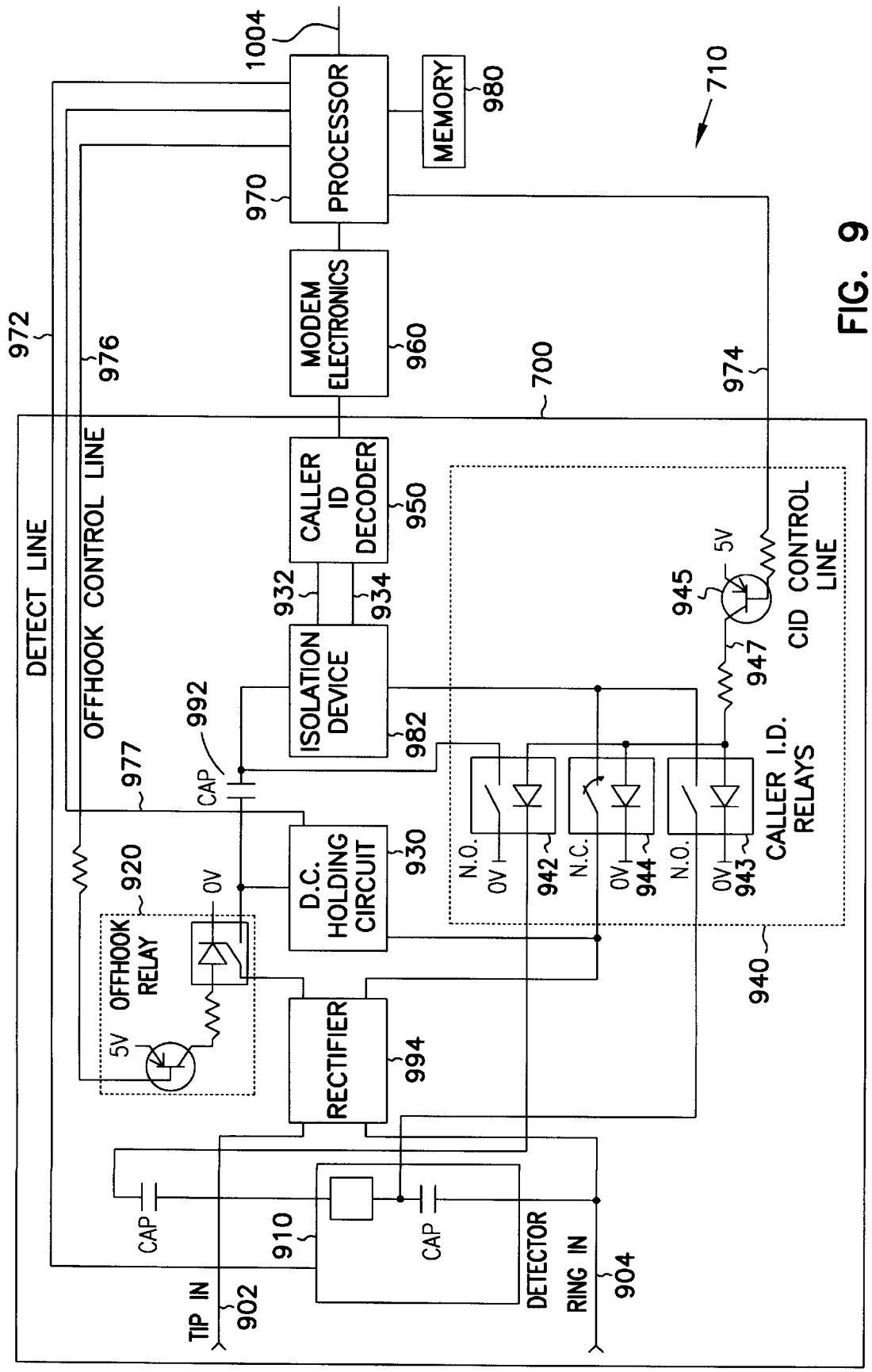
FIG. 9 is a schematic diagram of the caller ID interface of FIG. 8 according to one embodiment of the present invention.

FIG. 9 shows one embodiment of the modem with internal caller ID interface 710 as shown in FIG. 8.

Internal caller ID interface 700 includes detector 910, off-hook circuit 920, DC holding circuit 930, caller ID relays 940, caller ID decoder 950, processor 970, and memory 980. Alternate embodiments will reduce duplicity in circuitry by using off-hook, and DC holding circuits found in modem designs, and add caller ID relays 940, caller ID decoder 950, and appropriate signal lines to realize the internal caller ID interface 700. In other embodiments processor 970 is the modem processor and memory 980 is a portion of memory in the modem.

Detector 910 signals processor 970 on signal line 972 when an incoming call is received on telephone lines 902 and 904. Processor 970 signals caller ID relays 940 on signal line 974 to decode the caller ID information as transmitted by the telephone company after the line reversal event. Caller ID relays 940 route signals on telephone lines 902 and 904 to caller ID decoder 950 via isolation device 982 when signal 974 is pulled to a logic "0" state. When signal 974 is logic low, transistor 945 conducts and normally open optoisolated relays 942 and 943 close briefly while normally closed optoisolated relay 944 opens. The switching period only needs to be long enough to receive the frequency shift keying caller ID transmissions after the line reversal event. Rectifier 994 ensures that the telephone line polarity to the dc holding circuit 930 is consistent regardless of the polarity of the telephone service connections to lines 902 and 904. Isolation device 982 electrically isolates the caller ID interface 700 from the modem electronics 960. Isolation device 982 is typically a transformer, however, alternate embodiments employ an optocoupler device.

If the incoming caller ID information and the access matrix parameters indicate that the caller is authorized, then processor 970 answers the telephone call by asserting a logic "0" on line 976 to activate off-hook relay circuit 920 and engaging the telephone current loop using signal 977 to activate DC holding circuit 930. When these circuits are activated caller ID relays 940 are programmed to pass telephone signals 932 and 934 through caller ID decoder 950 to modem electronics 960 for demodulation and data processing.

If the caller is not authorized access, the caller ID interface 700 hangs up on the caller by momentarily taking the modem off-hook and returning to on-hook by toggling signal line 976. In this way, the caller ID interface hangs up on an unwanted caller without providing access to the caller. An alternate embodiment transmits a message to the unauthorized caller prior to hanging up on the caller.

In one embodiment, caller ID decoder 950 is the Mitel MT8841 Calling Number Identification Circuit as specified in the Mitel Microelectronics Digital/Analog Communications Handbook, which was incorporated by reference above. Processor 970 is the Zilog Z182 Microprocessor as specified in the Z180 Family Microprocessors and Peripherals Databook, which was also incorporated by reference above. Those skilled in the art will readily recognize that other caller ID decoders and processors may be used without departing from the scope and spirit of the present invention. Alternate embodiments may use sophisticated, multifunction decoding devices and data pumps to perform the functions of caller ID decoder 950. Additionally, processor 970 may be replaced with combinational logic to control the operation of the caller ID interface.

Figure 10:
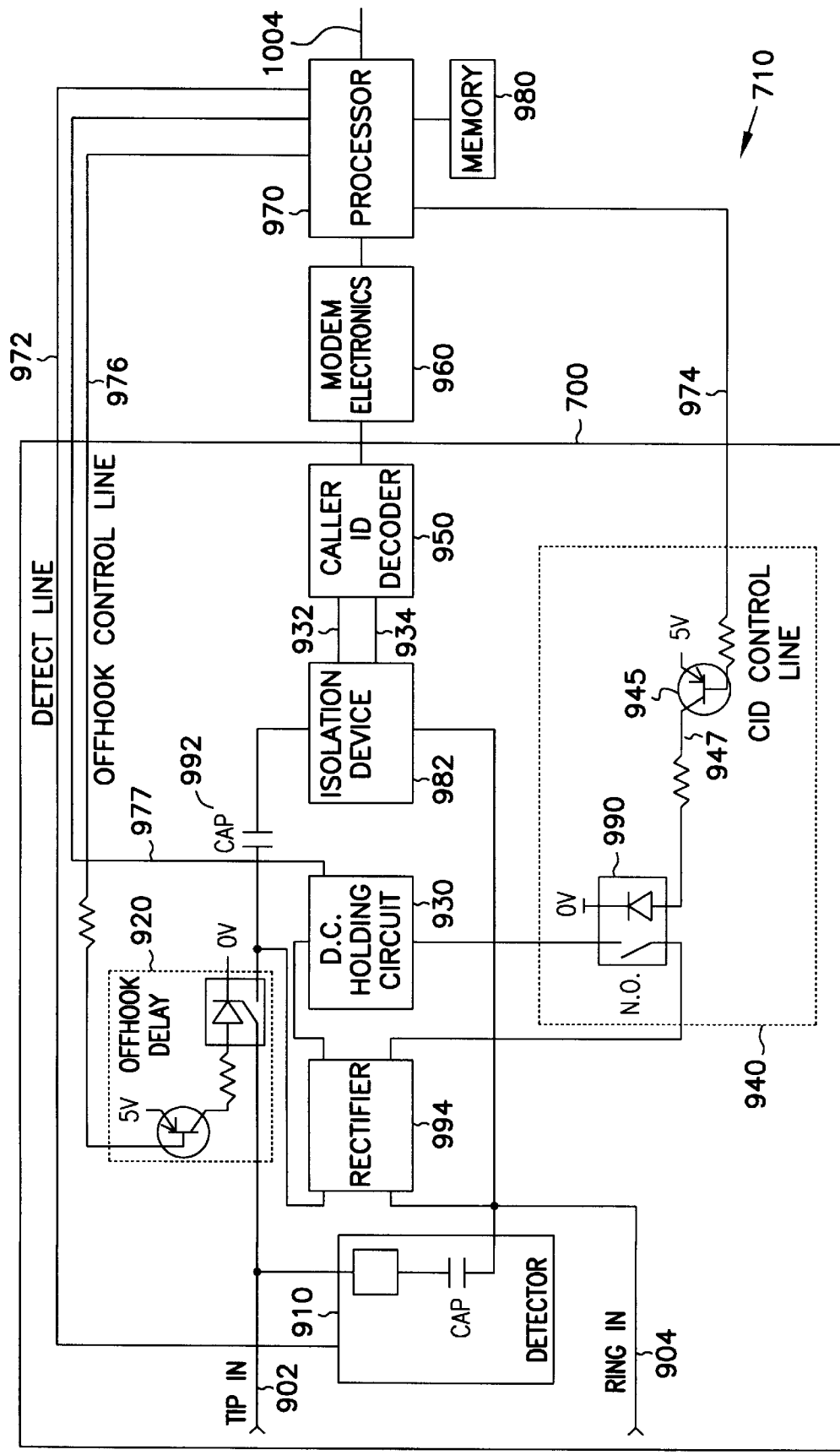
FIG. 10 is a schematic diagram of the caller ID interface of FIG. 8 according to one embodiment of the present invention.

An alternate embodiment of the caller ID interface 700 is shown in FIG. 10. This embodiment of the caller ID interface 700 uses a single relay 990 (instead of the three relays 942, 944, and 943 of FIG. 9) to activate dc holding circuit 930 for purposes of answering the telephone call. The on-hook condition of caller ID interface 700 is characterized by off-hook relay 920 (normally open) being open and relay 990 (normally closed) being open. The caller ID information from telephone lines 902 and 904 is decoded after the line reversal event by closing off-hook relay 920 to pass the frequency shift keying caller ID signals through capacitor 992 to caller ID decoder 950. Therefore capacitor 992 serves as a dc blocking element to create an ac path to caller ID decoder 950. Closing off-hook relay 920 connects the ac loop for frequency shift keying demodulation and decoding and the call is not answered as long as relay 990 remains open. If the caller ID information indicates an authorized caller, then closing relay 990 creates the off-hook condition for connecting the caller to the modem 710. If the caller ID information in conjunction with the access matrix indicates that the caller is unauthorized a quick hang up can be accomplished by briefly toggling relay 990 and off-hook relay 920 to answer the call and then hang up.

Those skilled in the art will readily recognize that other caller ID decoders and processors may be used without departing from the scope and spirit of the present invention. Alternate embodiments use sophisticated, multifunction decoding devices and data pumps to perform the functions of caller ID decoder 950. Additionally, processor 970 may be replaced with combinational logic to control the operation of the caller ID interface. Finally, alternate relay switching embodiments may be constructed which do not depart from the scope and spirit of the present invention.

Caller ID Encoded Transmissions

In the protocol shown in FIGS. 2A–2C the caller ID information is transmitted after the current wetting pulse. In one protocol, the caller ID information includes a message-type byte, a length byte, and data bytes consisting of date, time, telephone number with area code, telephone owner's name, and check sum byte and is sent using frequency shift keying after a line reversal. Several industry protocols for caller ID are being developed by telecommunications vendors, including:

1. Bellcore's single data message frame format and multiple data message frame format as described in Bellcore Technical Reference TR-NWT-000030, Issue 2, October 1992, which is hereby incorporated by reference;

2. Rockwell's Calling Number Delivery (CND) as described in Rockwell Application Note, Document No. 29800N73, Order No. 873, October 1991, which is hereby incorporated by reference; and 3. AT&T's Caller ID as described in the AT&T Microelectronics Modem Designer's Guide, Jun. 3, 1993, Doc. MN92-026DMOS, which is hereby incorporated by reference.

Figure 11:
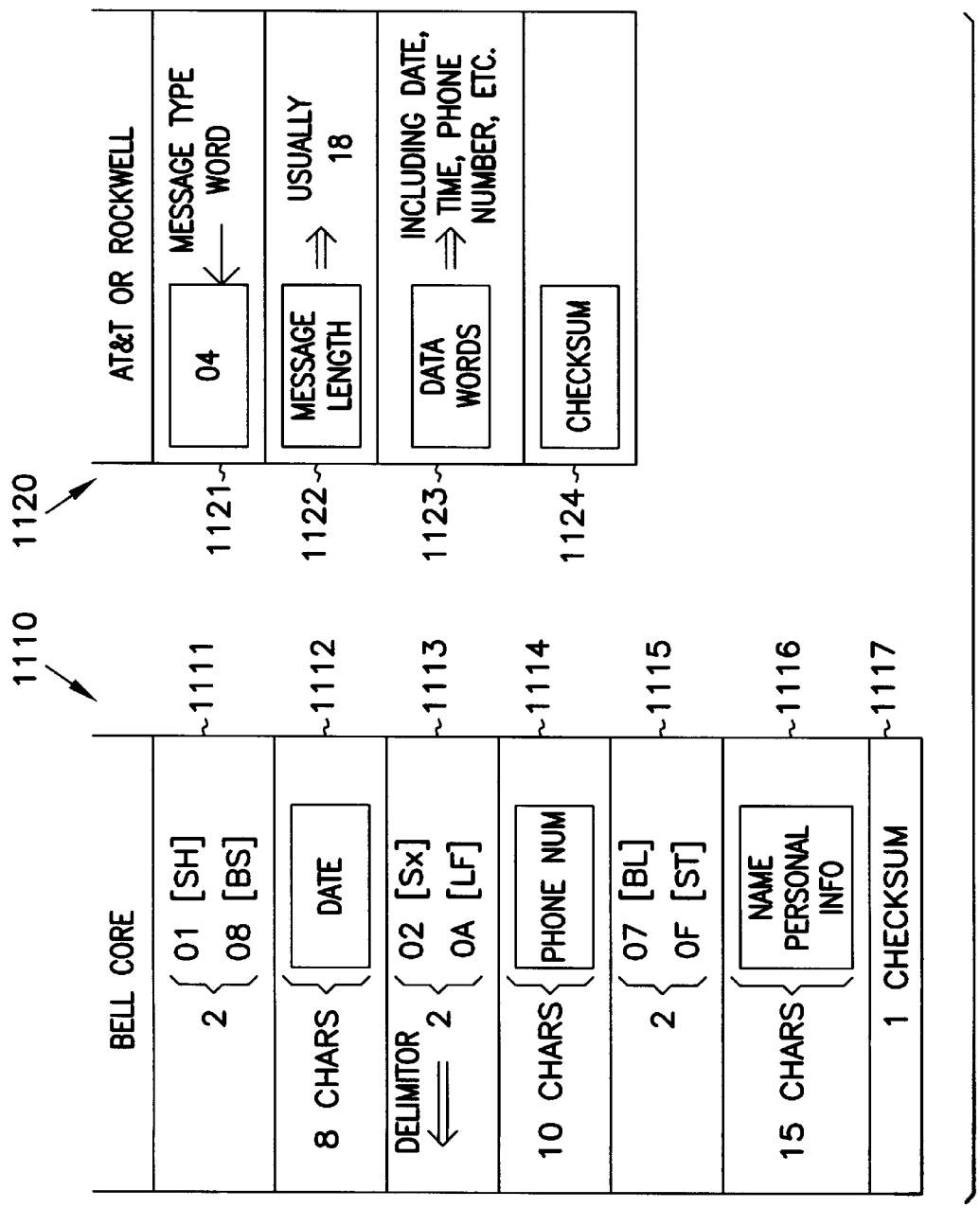
FIG. 11 is a block diagram showing the multiple data message format and single data message format used in standard caller ID encoded transmissions.

FIG. 11 summarizes the three caller ID protocols described above. The Bellcore multiple data message frame format 1110 is distinguished from the AT&T or Rockwell single data message frame format 1120 by examining the leading bytes 1111 (01H) and 1121 (04H).

Figure 12:
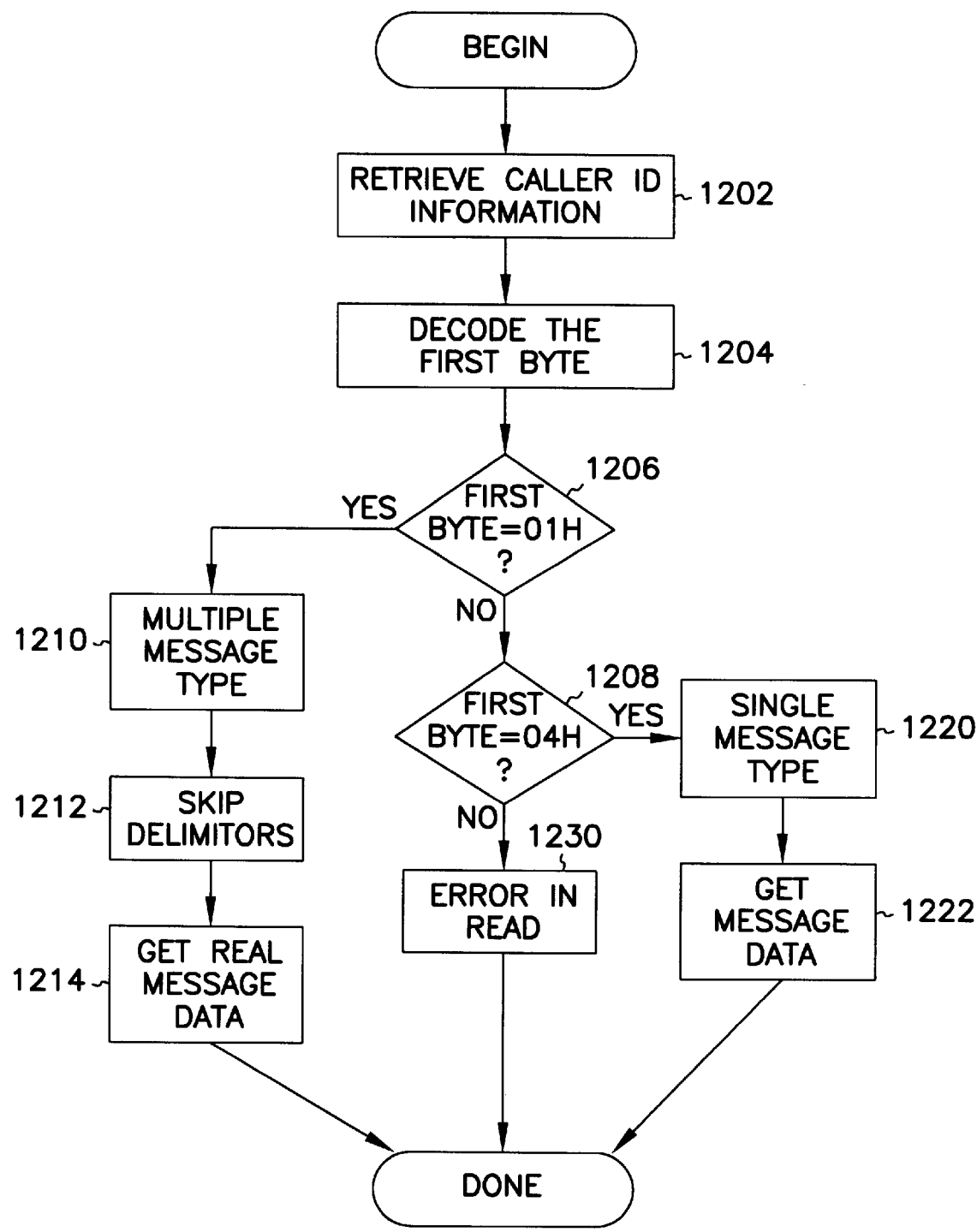
FIG. 12 is a flowchart showing one embodiment of a caller ID format recognition scheme.

FIG. 12 shows an algorithm which distinguishes between the different protocols for proper decoding of the incoming caller ID information in one embodiment of the present invention. The caller ID information is retrieved from the caller ID decoding hardware 1202 and the first byte is decoded to determine the message type 1204. If the first byte is 01H (1206), then the caller ID protocol is the multiple data message format 1110 of FIG. 11 (1210) and the message data is read after skipping the delimiters (1212, 1214). If the first byte is 04H (1208) then the caller ID information is in the single data message format 1120 of FIG. 11 (1220) and the message data can be read directly (1222). If the first byte is neither 01H or 04H, then the caller ID information is being transmitted by another protocol or an error has been made in the decoding or transmission 1230. Since the above mentioned protocols are the most widely used, the present algorithm provides for automatic switching between formats to ensure that both formats are properly read.

Those skilled in the art will readily recognize that the present invention can be modified to accommodate future caller ID message protocols without departing from the scope and spirit of the present invention, and that the protocols presented are not intended to be an exclusive or limited set of protocols for use with the present invention.

Quick Hang Feature

In one embodiment of the present invention the quick hang feature allows the modem to hang up immediately on an unwanted caller by placing the modem off hook for a duration of approximately one second, and then place the modem back "on hook" again. The modem is then ready to accept another call. This feature minimizes the amount of time an invalid user can tie up a phone line. Other durations are possible without departing from the spirit and scope of the present invention.

Time of Day Synchronization Using Caller ID

In one embodiment of the present invention time synchronization is accomplished using the decoded caller ID information which identifies the time of day to synchronize an on-board time-of-day clock.

Call Screening Using Caller ID Information

Figure 13:
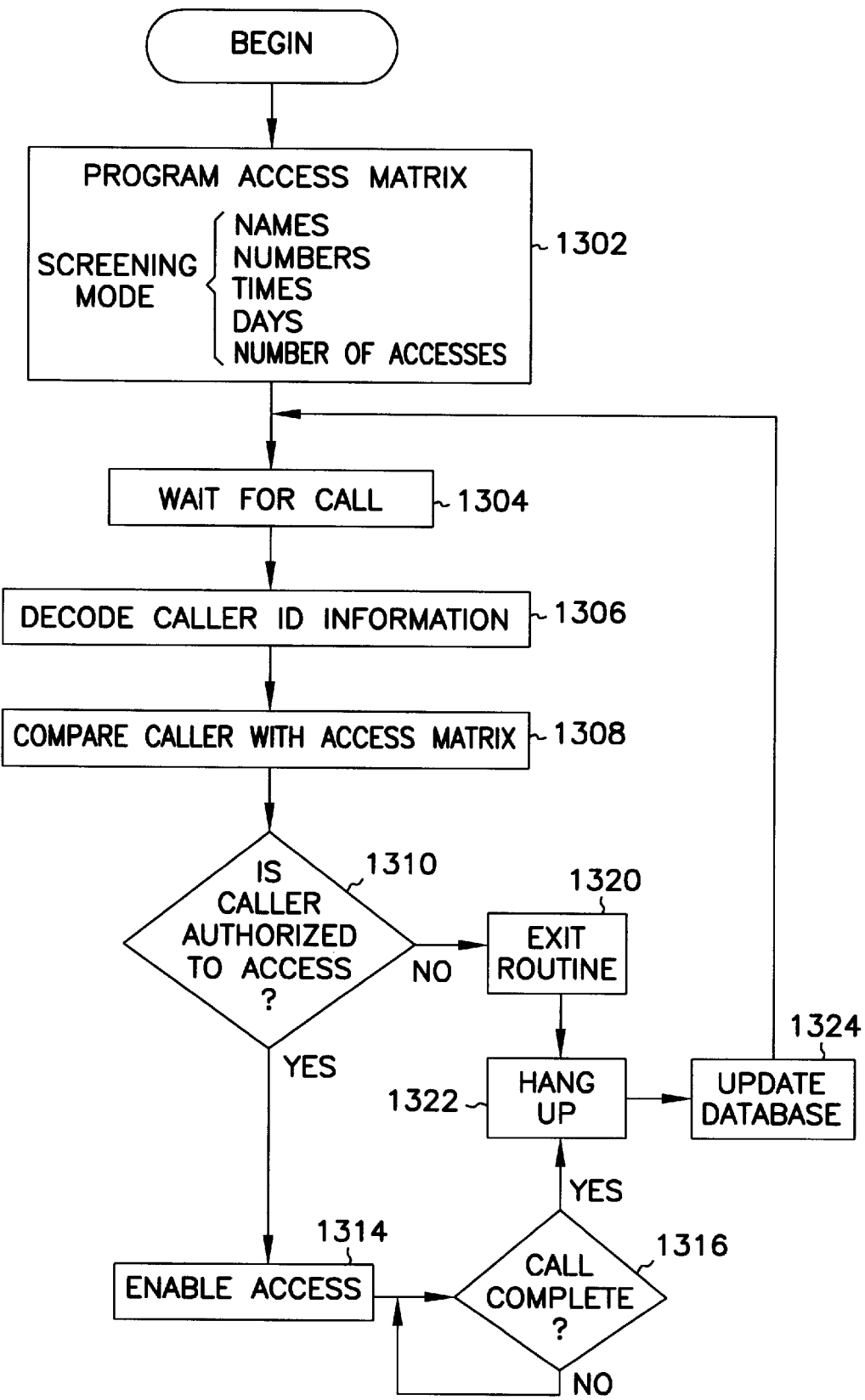
FIG. 13 is a flowchart of the general operation of one embodiment of the present invention.

The information available from decoding caller ID information allows the caller ID interface to screen users by a variety of parameters as specified in a preprogrammed access matrix. The flowchart shown in FIG. 13 describes the overall operation of the screening function. The program access matrix is programmed by specifying the screening mode and specifying the operative parameters to perform the screening, such as caller name, caller telephone number, time and day frames for receiving calls, and number of accesses (1302). In one embodiment of the present invention the receiving modem operates in the following modes or combination of modes which will be described further in the "Screening Modes Using Caller ID" section below:

1. Number Only Mode;
2. Blacklist Mode;
3. Day Only Mode;
4. Time Only Mode;
5. Name Only Mode;
6. S Register 50 Mode; and
7. Hybrid Modes The caller ID interface receives a call 1304, decodes the caller ID information 1306, and compares the caller ID information with the access matrix (a function of the screening mode, as described below) 1308, and determines whether the caller is authorized to access the modem 1310. If the caller is not authorized an exit routine is performed 1320 which may be a number of operations including, but not limited to, a friendly error message and a quick hang up 1322. If the modem is compiling a database of callers, the database can be updated with the received caller ID information 1324 before waiting for another call 1304. If the caller is authorized, access is enabled 1314 and allowed until the call is terminated 1316. The hang up procedure 1322 is followed by an database update 1324 before returning to the wait state for another call 1304. The step of determining whether access is authorized 1310 is discussed in detail in the below section on Screening Modes.

Screening Modes Using Caller ID

The following modes are used in one embodiment of the present invention to control access to a modem connected to the caller ID interface. The parameters of each mode become part of the preprogrammed access matrix. A number of examples will be offered following a brief description of the various modes of this embodiment:

Number Only Mode

In the number only mode, the modem compares an incoming caller ID number to phone numbers on a "number only" list. Only incoming calls with numbers matching the phone numbers on the list will be answered. The number list is part of the access matrix which is preprogrammed into the caller ID interface memory.

Blacklist Mode

In the blacklist mode, the modem compares an incoming caller ID number to a list of callers on a "blacklist." Any call which matches a phone number on the "blacklist" will be denied access to the device and the incoming call will be terminated immediately using a preprogrammed exit routine, such as the "quick-hang" feature described above. The blacklist and desired exit routine can be tailored depending on the particular blacklisted caller. For example, a BBS might want to quick hang up on a blacklisted abuser of the bulletin board, but only give a "late dues" message to a blacklisted user who is merely late in paying dues. The access matrix contains all of the blacklist parameters.

Day Only Mode

In the day only mode, the access matrix is programmed to authorize calls only on specific days.

Time Only Mode

In the time only mode, the modem only answers calls during a certain preprogrammed times of the day and ignores calls outside of those specified times. For example, this feature enhances the security to a computer network provided by the present invention during non-business hours.

Name Only Mode

The name only mode authorizes access only to callers whose names are preprogrammed in a name table in the access matrix. This is a means for inclusively authorizing access to the modem. (The blacklist mode is an exclusive means for authorizing access to the modem.)

S Register 50 Mode

The S Register 50 mode provides a limited number of accesses by a particular user. The access matrix is preprogrammed with a predetermined number of calls allowed to a user before that user is black listed. This feature is especially useful for electronic bulletin board service operators because it allows them to screen out unwanted users as soon as the S Register number is reached. The S Register mode also allows for limiting the number of accesses made by a new user of the bulletin board, since in one embodiment of the present invention a new user is assigned a position in the access matrix and subject to a maximum number of accesses, similar to the known users. This is known as a Temporary Blacklist mode, since after the predetermined number of accesses, the user is temporarily blacklisted until the access counter for that user is reset by the system administrator.

Hybrid Modes

Any combination of the above modes provides a specialized access matrix based on each listed user. For example, access authority can be limited to a particular caller name and at a particular time-of-day by programming a specific caller name and access times as demonstrated by the examples below.

Screening Mode Examples

Several access matrix examples for a BBS and their associated interpretations are described below for each entry in the table, according to one embodiment of the present invention.

TABLE 1

BLACKLIST MODE

| NUMBER | NAME | DAY/TIME | S50 | EXIT ROUTINE |
|---|---|---|---|---|
| (b) 333-3333 | | | | quick hang |
| | (b) Mr. J | | | "Illegal Access" |

Table 1 shows two examples of the blacklist mode. Any caller from 333-3333 will receive a quick hang immediately on attempt to access the BBS modem. Additionally, any time Mr. J attempts to call (from any of his phones), the message "Illegal Access" will be displayed prior to hang up by the BBS.

TABLE 2

NAME ONLY MODE

| NUMBER | NAME | DAY/TIME | S50 | EXIT ROUTINE |
|---|---|---|---|---|
| | Mr. Z | | | |
| | Ms. B | | | |

Table 2 shows that only Mr. and Ms. B can access the BBS modem, regardless of telephone number or day.

TABLE 3

NUMBER ONLY MODE

| NUMBER | NAME | DAY/TIME | S50 | EXIT ROUTINE |
|---|---|---|---|---|
| 123-4567 | | | | |
| 676-8888 | | | | |

Table 3 shows that only callers from 123-4567 and 676-8888 can access the BBS modem, regardless of name or time of day.

TABLE 4

TIME ONLY MODE

| NUMBER | NAME | DAY/TIME | S50 | EXIT ROUTINE |
|---|---|---|---|---|
| | | /9–17 | | |

Table 4 shows that any caller between 9:00 a.m. and 5:00 p.m. can access the BBS modem (24 hour time format used in this example).

TABLE 5

HYBRID MODES

| NUMBER | NAME | DAY/TIME | S50 | EXIT ROUTINE |
|---|---|---|---|---|
| 333-3333 | Mr. A | M–W/6–13, 14–15 | 5 | quick hang |
| 444-4444 | Ms. B | ALL/9–17 | | |
| 555-5555 | | M–F/9–17 | 10 | "PAY DUES" |
| | Mr. C | M–W/ | 3 | |

Table 5 provides four examples of access matrix entries. In the first line, Mr A. can access the BBS modem from Monday to Wednesday and at the times of 6:00 a.m. to 1:00 p.m. and 2:00 p.m. to 3:00 p.m. Mr. A can only access the BBS modem five (5) times before access is denied and the system administrator is notified. Mr. A will get a quick hang up on his sixth attempt to access the BBS modem, and attempts thereafter, until his access register is reset by the system administrator.

Ms. B can access the BBS modem all days of the week, but only between the hours of 9:00 a.m. to 5:00 p.m. Ms. B can access the BBS modem an unlimited number of times.

Any caller from phone number 555-5555 can access the BBS modem from Monday to Friday between the hours of 9:00 a.m. to 5:00 p.m. A "Pay Dues" message will be displayed to the user before a hang up on the eleventh attempt to access the BBS modem, and subsequent attempted accesses. The system administrator must reset the access counter for future access authorization.

Mr. C can access the BBS modem from any of his phone numbers, and can access at any time on Monday through Wednesday. After three accesses, Mr. C's exit routine will be whatever the default exit routine for the BBS happens to be.

The described screening modes are not limiting and not exclusive. One skilled in the art would readily recognize that other modes and variations of these modes are possible without departing from the scope and spirit of the present invention.

One Embodiment of the Screening Algorithm

The previously described screening modes are not exclusive or limiting to the present Invention. Neither is the particular interaction of the screening modes. The following is only one embodiment of a screening algorithm offered to demonstrate the interaction between screening modes in one embodiment of the present invention.

FIG. 14 illustrates one embodiment of the authorization process using the above described screening modes. The caller ID interface waits for a call 1402, and gets the caller ID information upon detecting an incoming call 1404, 1406. The caller ID information is verified against the access matrix, in this example the caller's telephone number is verified 1410, 1412. If the number is on the list, then the time of day is verified 1414 and the date is verified 1416 before the modem is allowed to answer the call 1418. The modem is engaged in the call as long as it is connected 1420 and the call is complete after the connection is lost 1422. The modem then quick hangs up 1440 and disconnects 1442 before waiting for the next call 1402. If the time o f day or date is invalid the quick hang procedure is automatically initiated. If the telephone number is not on the number list 1410 the user's number of accesses is checked to ensure that the maximum is not exceeded 1430 and if the number is not on the temporary blacklist 1432 it is added 1436 prior to answering the call 1418. If the number is on the blacklist 1432, a separate S Register 50 for the blacklist is checked 1434 and quick hang is initiated 1440, 1442 if the maximum number of accesses is exceeded, else the register for this caller is incremented 1438 and the call answered 1418, 1420, and 1422. The quick hang procedure, 1440 and 1442, is again followed by waiting for the next call 1402.

CONCLUSION

The present invention was described in terms of a modem interface, however, the methods and apparatus are applicable to a number of data exchange devices. For example, the present invention is adaptable to any system with caller identification information.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and equivalents thereof.

We claim:

1. A system, comprising:
   a signal conditioner receiving input signals from a signal source over a telephone line and producing conditioned signals;
   an overvoltage control for limiting voltage applied by the signal source;
   an isolation module, connected to the signal conditioner, receiving the conditioned signals and providing output signals which are isolated versions of the conditioned signals; and a signal monitor receiving the isolated versions of the conditioned signals and validating a line reversal event on the telephone line when the isolated versions of the conditioned signals exhibit a pulse having a duration approximately equal to a predetermined time period.

2. The system of claim 1, wherein the signal conditioner comprises a full wave rectifier.

3. The system of claim 1, wherein the signal conditioner comprises two half-wave rectifiers.

4. The system of claim 1, wherein the signal conditioner comprises a transformer.

5. The system of claim 1, wherein the signal conditioner has a characteristic time constant which is less than a period of a ringing signal.

6. The system of claim 1, wherein the signal monitor validates the line reversal event if the conditioned signals have pulse lengths of approximately a characteristic time constant of the signal conditioner.

7. The system of claim 1, wherein the signal monitor validates the line reversal event when the isolated versions of the conditioned signals are quiet for a predetermined time period after the line reversal event.

8. The system of claim 1, wherein pulses substantially longer than a characteristic time constant of the signal conditioner are ignored as ringing signals.

9. The system of claim 1, wherein pulses substantially shorter than a characteristic time constant of the signal conditioner are ignored as noise pulses.

10. The system of claim 1, wherein the signal monitor is a processor which validates the line reversal event by monitoring the pulse length of the isolated versions of the conditioned signals and by detecting a silent period.

11. The system of claim 1 wherein the isolation module comprises an optoisolated transistor.

12. The system of claim 1 wherein the overvoltage control comprises two zener diodes connected in series.

13. A system, comprising:
a signal conditioner including a full wave rectifier, the signal conditioner receiving input signals from a signal source over a telephone line and producing conditioned signals;
a zener diode for limiting voltage applied by the signal source;
an optoisolated transistor, connected to the fall wave rectifier, receiving the conditioned signals and providing output signals which are isolated versions of the conditioned signals; and
a signal monitor receiving the isolated versions of the conditioned signals and validating a line reversal event on the telephone line when the isolated versions of the conditioned signals exhibit a pulse having a duration approximately equal to a predetermined time period.

14. The system of claim 13, wherein the signal conditioner has a characteristic time constant which is less than a period of a ringing signal.

15. The system of claim 13, wherein the signal monitor validates the line reversal event if the conditioned signals have pulse lengths of approximately a characteristic time constant of the signal conditioner.

16. The system of claim 13, wherein the signal monitor validates the line reversal event when the isolated versions of the conditioned signals are quiet for a predetermined time period after the line reversal event.

17. The system of claim 13, wherein pulses substantially longer than a characteristic time constant of the signal conditioner are ignored as ringing signals.

18. The system of claim 13, wherein pulses substantially shorter than a characteristic time constant of the signal conditioner are ignored as noise pulses.

19. The system of claim 13, wherein the signal monitor is a processor which validates the line reversal event by monitoring a pulse length of the isolated versions of the conditioned signals and by detecting a quiet period of a predetermined length.

20. A system for detecting the reversal of input signals received from a signal source over a telephone line, comprising:
signal conditioning means for receiving the input signals and producing conditioned signals which are a function of line reversal events on the telephone line; and
signal monitoring means for receiving the conditioned signals and detecting a line reversal event on the telephone line when the conditioned signals exhibit a pulse having a duration approximately equal to a predetermined time period.

21. The system according to claim 20 further comprising isolating means connected between the signal conditioning means and the signal monitoring means, the isolating means receiving the conditioned signals and providing isolated versions of the conditioned signals to the signal monitoring means.

22. The system according to claim 20 further comprising overvoltage limiting means for limiting the voltage applied by the signal source.

23. The system of claim 20, wherein the signal conditioning means has a characteristic time constant which is less than a period of a ringing signal.

24. The system of claim 20, wherein the signal monitoring means validates the line reversal event if the conditioned signals have pulse lengths of approximately a characteristic time constant of the signal conditioning means.

25. The system of claim 20, wherein the signal monitoring means validates the line reversal event when the conditioned signals are quiet for a predetermined time period after the line reversal event.

26. The system of claim 20, wherein a characteristic time constant of the signal conditioning means is substantially determined by a capacitor and a resistor.

27. The system of claim 20, wherein pulses substantially longer than a characteristic time constant of the signal conditioning means are ignored as a ringing signal.

28. The system of claim 20, wherein pulses substantially shorter than a characteristic time constant of the signal conditioning means are ignored as noise pulses.

29. The system of claim 20, wherein the signal monitoring means is a processor which validates the line reversal event by monitoring the pulse length of the conditioned signals and by detecting a silent period of a predetermined time.

30. A method comprising the steps of:
generating conditioned signals as a function of input signals received from a signal source over a telephone line;
monitoring the conditioned signals for a pulse of duration approximately equal to a first predetermined time period; and
detecting a valid line reversal event on the telephone line if the pulse is detected and the signal source is quiet during a second predetermined time period.

31. The method according to claim 30 wherein voltage applied by the signal source is limited.

32. The method according to claim 30 wherein the step of generating conditioned signals comprises the step of isolating the conditioned signals from the input signals.

33. The method according to claim 30, further comprising the steps of:

waiting for transmission of caller identification information; and recording the caller identification information from a telephone call.

34. The method according to claim 30, further comprising the steps of:

waiting for signaling tones to complete transmission; and transmitting a current wetting pulse.

35. The method according to claim 33, further comprising the step of:

if the caller identification information indicates an authorized caller, answering the telephone call.

36. The method according to claim 33, further comprising the step of:

if the caller identification information indicates an unauthorized caller, terminating the telephone call.

37. A caller identification interface for a modem, comprising:

caller identification decoding means to decode caller identification information received over a telephone line;

processing means, connected to the decoding means, for processing the decoded caller identification information; and line reversal detection means, connected to the processing means, for detecting a valid line reversal event on the telephone line when isolated versions of conditioned signals produced from input signals received from a signal source over the telephone line exhibit a pulse having a duration approximately equal to a predetermined time period.

38. The caller identification interface of claim 37, further comprising:

a telephone input port, connected to a telephone line, for receiving the telephone signals into the interface;

a hang up circuit, connected to the telephone input port, for hanging up the telephone line;

a telephone output port for transmitting telephone signals to a device;

a pass through circuit, connected to the processing means, for interconnecting the telephone input port to the telephone output port upon a command from the processing means; and an in-use detector, connected to the telephone output port and the processing means, for detecting a connection between the telephone line and a device.

* * * * *